United States Patent
Han et al.

(10) Patent No.: US 8,559,880 B2
(45) Date of Patent: Oct. 15, 2013

(54) METHOD AND APPARATUS OF IMPROVING CAPACITY OF CHANNEL

(75) Inventors: Byung Wook Han, Incheon (KR); Joon Ho Cho, Gyeongsangbuk-do (KR)

(73) Assignee: POSTECH Academy-Industry Foundation, Pohang-si (KR)

( * ) Notice: Subject to any disclaimer, the term of this patent is extended or adjusted under 35 U.S.C. 154(b) by 1014 days.

(21) Appl. No.: 12/605,766

(22) Filed: Oct. 26, 2009

(65) Prior Publication Data
US 2010/0173589 A1 Jul. 8, 2010

(30) Foreign Application Priority Data
Jan. 7, 2009 (KR) .......... 10-2009-001276

(51) Int. Cl.
*H04B 1/00* (2006.01)
(52) U.S. Cl.
USPC ........ 455/63.1; 455/296; 455/67.11; 375/347
(58) Field of Classification Search
USPC .......... 455/63.1, 114.2, 296, 67.11; 375/347, 375/350, 259, 295, 316
See application file for complete search history.

(56) References Cited

U.S. PATENT DOCUMENTS

2003/0043925 A1* 3/2003 Stopler et al. ................ 375/254

FOREIGN PATENT DOCUMENTS

| | | |
|---|---|---|
| JP | 10-2007-0085128 | 8/2007 |
| JP | 10-2008-0083808 | 9/2008 |
| KR | 10-2007-042100 | 4/2007 |
| KR | 10-2007-0085128 | 8/2007 |
| KR | 10-2008-0083808 | 9/2008 |
| WO | 2007/015143 | 2/2007 |
| WO | WO 2007/015143 * | 2/2007 |

OTHER PUBLICATIONS

Cho, "*Joint Transmitter and Receiver Optimization in Addtive Cyclostationary Noise*", IEEE Transactions on Information Theory, vol. 50, No. 12, Dec. 2004.
Gardner, *Explitation of Spectral Redundancy in Cyclostationary Signals*, IEEE SP Magazine, Apr. 1991.
Zhang, et al., "*A Spectrum-Shaping Perspective on Cognitive Radio*", IEEE SP Magazine, Oct. 14-18, 2008, pp. 1-12.
Joon Ho Cho "Multiuser Constrained Water-Pouring for Continuous-Time Overload Gaussian Multiple-Access Channels" *IEEE Transactions on Information Theory* vol. 54, No. 4 (Apr. 1, 2008) pp. 1437-1459.
Notice of Allowance issued by KIPO for Korean Patent Application No. 10-2009-0001276, Jun. 27, 2011.

* cited by examiner

*Primary Examiner* — Nay A Maung
*Assistant Examiner* — Angelica M Perez
(74) *Attorney, Agent, or Firm* — Occhiuti Rohlicek & Tsao LLP

(57) ABSTRACT

A method and apparatus of improving capacity of channel is disclosed. A vector X(t) is generated based on a cycle period 1/T of a wide-sense cyclo-stationary (WSCS) noise and a whitening filter W(t) for decorrelating the WSCS noise in frequency domain. A scalar signal X(t) is generated by shifting the vector X(t) in the frequency domain.

10 Claims, 17 Drawing Sheets

METHOD AND APPARATUS OF IMPROVING CAPACITY OF CHANNEL

CROSS-REFERENCE TO RELATED APPLICATIONS

This application claims the benefit of priority of Korean Patent Application No. 10-2009-0001276 filed on Jan. 7, 2009 which is incorporated by reference in its entirety herein.

BACKGROUND OF THE INVENTION

1. Field of the Invention

The present invention relates to wireless communication and, more particularly to a method and apparatus for improving capacity of channel in a wireless communication system.

2. Related Art

Wireless communication technology has been exponentially advancing with the development of high-level signaling schemes for efficient spectrum use. In turn, this necessitates settlements of the fundamental problems in communication and information theory, such as the capacity of physical channel over which the source and sink reliably transfers the information. The original concept of capacity, first developed by Claude E. Shannon in 1968, means the highest data rate in bits per channel use at which information can be sent with arbitrary low probability of error. From Shannon's channel coding theorem, the achievability of capacity of channel and the reliable encoder-decoder pairs have been widely studied with the problem of finding capacity of channel for various physical channel models. For a wideband communication link, the physical channel between the transmitter and receiver is generally modeled as the frequency-selective channel. Under the natural assumption that the noise process at the receiver front-end is modeled as wide-sense stationary (WSS) random process, it is well-known that the capacity of channel for wideband frequency selective channel can be achievable by the noise-whitening filter and the water-filling method.

In the interference channel, transmitters interferes non-desired receivers. If each transmitter use a linear filtering to transmit the signal, the interferences at the receivers can be modeled as wide-sense cyclo-stationary (WSCS) random process which has cycle period same as the sampling period of linear filtering. However, information theoretic result with WSCS interference or noise rarely exists.

It turns out that the tools needed to formulate the problem in a mathematically tractable form are the vectorized Fourier transform (VFT) and the matrix-valued-power spectrum density (MV-PSD). In some related literatures, the these tools have been used to design cyclic Wiener filters and linear receivers in a cyclo-stationary noise, and also used to find jointly optimal linear transmitter (Tx) and receiver (Rx) pairs, where the mean-squared error (MSE) at the output of the linear receiver is the objective to be minimized and the transmit waveform for linear modulation is found. However, no information-theoretic result has been derived yet using these tools.

SUMMARY OF THE INVENTION

Method and apparatus of improving capacity of channel is provided.

We consider a wide-sense cyclo-stationary (WSCS) Gaussian noise channel where the additive noise consists of WSCS interference as well as WSS Gaussian noise. In this disclosure, the capacity of WSCS channel is found, the related mathematical tools are achieved, and the optimal signaling scheme for encoder-decoder pair is designed.

A method of improving capacity of channel includes the design of transmit waveform for the data communication system in the WSCS channel and the design of receiver structure matched to transmit signal. The WSCS random process may be vectorized into the vector-valued WSS random process and the vector-valued WSS random process may be scalarized into the WSCS random process by using the vectorizer/scalarizer.

In an aspect, a method of transmitting data in a wireless communication system is provided. The method includes generating a vector X(t) based on a cycle period 1/T of a wide-sense cyclo-stationary (WSCS) noise and a whitening filter W(t) for decorrelating the WSCS noise in frequency domain, generating a scalar signal X(t) by shifting the vector X(t) in the frequency domain, and transmitting the scalar signal X(t) to a receiver via a single antenna.

The step of generating the scalar signal X(t) may include shifting the vector X(t) in frequency domain, and combining entries of the shifted vector to generate the scalar signal X(t). Each entry of the vector X(t) may be shifted with different shifting frequency. Shifting frequencies for the vector X(t) may be obtained based on the cycle period 1/T.

The transmit signal X(t) may be generated by:

$$X(t) = \sum_{l=1}^{2L+1} X_l(t) e^{j2\pi f_l t}.$$

where $L = \left\lceil \dfrac{2BT-1}{2} \right\rceil$, lth shifting frequency $$f_l = \frac{l-L-1}{T},$$

B is a bandwidth, and $X_l(t)$ is lth entry of the vector X(t).

The step of generating the vector X(t) may include transforming a channel H(f) to a equivalent channel $\tilde{H}(f)$ by using the whitening filter W(t), determining a power spectrum $R_{\tilde{X},opt}(f)$ based on the equivalent channel, and generating the vector X(t) based on the power spectrum $R_{\tilde{X},opt}(f)$.

In another aspect, a transmitter includes a preprocessor configured to generate a vector X(t) based on a cycle period 1/T of a wide-sense cyclo-stationary (WSCS) noise and a whitening filter W(t) for decorrelating the WSCS noise in frequency domain, a scalarizer configured to generate a scalar signal X(t) by shifting the vector X(t) in the frequency domain, and an antenna for transmitting the scalar signal X(t) to a receiver.

In still another aspect, a receiver includes a channel estimator configured to estimate a channel and wide-sense cyclo-stationary (WSCS) noise, and a controller configured to feedback a cycle period 1/T of the WSCS noise and a whitening filter W(t) for decorrelating the WSCS noise in frequency domain to a transmitter. The receiver may further include a vectorizer configured to convert a receive signal Y(t) to a vector Y(t).

DESCRIPTION OF EXEMPLARY EMBODIMENTS

1. Channel Model and Problem Formulation

Figure 1:
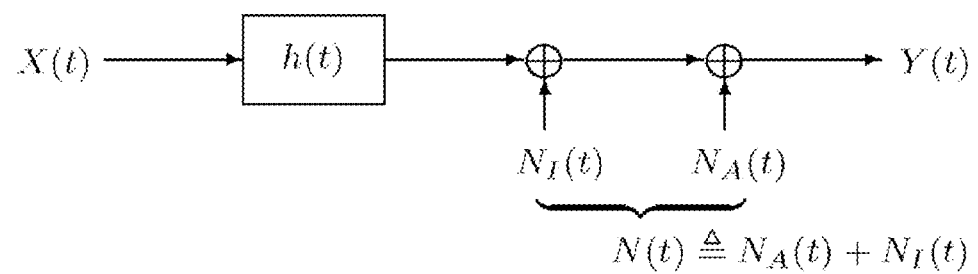
FIG. 1 shows the complex baseband equivalent model of additive WSCS Gaussian noise channel.

The channel model in complex baseband is depicted in FIG. 1. The channel input $X(t)$ passes through a frequency-selective linear time-invariant (LTI) filter with impulse response $h(t)$, and is received in the presence of an additive noise $N(t)$. Thus, the channel output $Y(t)$ is given by $$Y(t)=h(t)*X(t)+N(t), \quad (1)$$

where the binary operator * denotes convolution integral. The additive noise $N(t)$ is the summation of an ambient noise $N_A(t)$ and an interfering signal $N_I(t)$, i.e., $$N(t)=N_A(t)+N_I(t), \quad (2)$$

where the ambient noise is modeled as a proper-complex white Gaussian noise and the interfering signal is modeled as a proper-complex zero-mean wide-sense cyclo-stationary (WSCS) Gaussian random process with fundamental cycle period $T_0>0$. Such a cyclostationary interference can be observed when there is a co-channel or an adjacent channel user that employs linear modulation of data symbols from a Gaussian codebook with symbol transmission rate $1/T_0>0$.

Since the overall additive noise $N(t)$ is also a proper-complex zero-mean WSCS Gaussian random process with a fundamental cycle period $T_0$, the second-order statistics of the complex Gaussian random process $N(t)$ satisfy $$\mathbb{E}\{N(t)\}=0, \forall t, \quad (3a)$$

$$\mathbb{E}\{N(t)N(s)\}=0, \forall t, \forall s, \quad (3b)$$

$$r_N(t,s)=\mathbb{E}\{N(t)N(s)^*\}=\mathbb{E}\{N(t+mT_0)N(s+mT)^*\}, \forall t,$$
$$\forall s, \forall m\in\mathbb{Z}, \quad (3c)$$

where the operator $\mathbb{E}\{\cdot\}$ denotes expectation, the superscript $(\cdot)^*$ denotes complex conjugation, and the set $\mathbb{Z}$ denotes the set of all integers.

It is also assumed that the filter and the noise are band-limited to $f\in[-B_0,B_0)$, i.e., the impulse response $h(t)$ and the additive noise $N(t)$ have no frequency component outside the frequency band $f\in[-B_0,B_0)$. Let $H(f)$ be the Fourier transform of $h(t)$ and $R_N(f, f')$ be the double Fourier transform of the auto-correlation function $r_N(t,s)$, i.e., $$H(f) \triangleq \Im\{h(t)\}=\int_{-\infty}^{\infty} h(t)e^{-j2\pi ft}dt, \quad (4a)$$

$$R_N(f,f') \triangleq \Im^2\{r_N(t,s)\}=\int_{-\infty}^{\infty}\int_{-\infty}^{\infty} r_N(t,s)e^{-j2\pi(ft-f's)}dtds, \quad (4b)$$

where the operators $\Im\{\cdot\}$ and $\Im^2\{\cdot\}$ denote the Fourier transform and the double Fourier transform, respectively. Then, these assumptions can be written as $$H(f)=0, \forall f\notin[-B_0,B_0), \quad (5a)$$

$$R_N(f,f')=0, \forall (f,f')\notin[-B_0,B_0)\times[-B_0,B_0), \quad (5b)$$

where the set operator $\times$ denotes the Cartesian product.

It is well known that a cyclostationary random process with the period $T_0$ consists of impulse fences on the lines $f=f'-m/T_0$, for $m\in\mathbb{Z}$. In other words, there exist functions $$\{R_N^{(k)}(f)\}_{k\in\mathbb{Z}}$$

such that $$R_N(f,f') = \sum_{k=-\infty}^{\infty} R_N^{(k)}\left(f - \frac{k}{T_0}\right)\delta\left(f - f' - \frac{k}{T_0}\right), \quad (6)$$

where $\delta(\cdot)$ denotes the Dirac delta function. To avoid considering pathological functions, it is additionally assumed that the Fourier transform $H(f)$ of the frequency-selective channel and the functions $\{R_N^{(k)}(f)\}_{k\in\mathbb{Z}}$ that represent the heights of impulse fences are all piecewise smooth. The alternate expression (6) of (4b) also shows that a necessary condition for the band-limited additive noise $N(t)$ to be cyclostationary is $B_0>1/T_0$. Otherwise, $R_N(f, f')$ consists of a single impulse fence on $f=f'$ and, consequently, $N(t)$ reduces to a WSS Gaussian random process.

Given the channel model described above, the objective of the optimization problem is to find jointly optimal transmit and receive schemes that achieves the maximum information rate between the channel input and the output with arbitrarily small error rate, i.e., the capacity of the channel, subject to the average power constraint $$\lim_{T\to\infty} \frac{1}{2T}\int_{-T}^{T} \mathbb{E}\{|X(t)|^2\}dt = P, \quad (7)$$

on the complex-valued channel input $X(t)$.

2. FRESH Vectorization and Scalarization

In this section, we propose two transformation techniques that convert back and forth between a scalar-valued signal and a vector-valued one. These transformations are used in the next section to re-formulate the problem in the frequency domain. We also make their links with the vectorized Fourier Transform (VFT) and the matrix-valued-power spectrum density (MV-PSD) of a deterministic signal and a WSCS random process, respectively.

A. FRESH Vectorization of a Deterministic Signal and VFT

In this subsection, we introduce a transformation that converts a scalar-valued signal to a vector-valued one and examine how the transformation works in the time and the frequency domains for a deterministic signal. To begin with, we define the notion of excess bandwidth.

Definition 1: Given a reference rate pair (B,1/T), where B is a bandwidth and 1/T is a reference rate, excess bandwidth $\beta$ as a function of (B,1/T), is defined by the relation $$BT = \frac{1+\beta}{2}. \tag{8}$$

The reference rate 1/T is a cycle period of a WSCS noise.

Note that the excess bandwidth is not necessarily non-negative. For the linear modulation with a square-root raised cosine (SRRC) waveform and the symbol rate the same as the reference rate, the roll-off factor of the SRRC waveform is equal to the excess bandwidth. In what follows, we simply call reference rate as rate.

Before introducing a transformation that converts a scalar-valued signal to a vector-valued signal, we define Nyquist zones and their center frequencies.

Definition 2: Given a bandwidth-rate pair (B,1/T), the lth Nyquist zone $\mathcal{F}_l$ is defined as $$\mathcal{F}_l \triangleq \left\{ f : f_l - \frac{1}{2T} \leq f \leq f_l + \frac{1}{2T} \right\}, \tag{9}$$

for l=1, 2, ..., 2L+1, where L is defined as $$L \triangleq \left\lceil \frac{\beta}{2} \right\rceil = \left\lceil \frac{2BT-1}{2} \right\rceil, \tag{10}$$

and the center frequency $f_l$ of the lth Nyquist zone $\mathcal{F}_l$ is defined as $$f_l \triangleq \frac{l-L-1}{T}. \tag{11}$$

For convenience, we denote the (L+1)th Nyquist zone as $\mathcal{F}$, i.e., $$\mathcal{F} \triangleq \mathcal{F}_{L+1} = \left\{ f : -\frac{1}{2T} \leq f < \frac{1}{2T} \right\}. \tag{12}$$

Definition 3: The FREquency SHift (FRESH) vectorization s(t) with reference pair (B,1/T) of a scalar-valued deterministic s(t) is defined as $$s(t) \triangleq \begin{bmatrix} s_1(t) \\ s_2(t) \\ \vdots \\ s_{2L+1}(t) \end{bmatrix}, \tag{13a}$$

where the lth entry $s_l(t)$ is given by $$s_l(t) = (s(t)e^{-j2\pi f_l t}) * g_{1/(2T)}(t), \tag{13b}$$

for l=1, 2, ..., 2L+1, and $g_{1/(2T)}(t)$ is the impulse response of the ideal lowpass filer with bandwidth 1/(2T), i.e., the Fourier transform $G_{1/(2T)}(f) \triangleq \mathfrak{F}\{g_{1/(2T)}(t)\}$ is given by $$G_{1/(2T)}(f) = \begin{cases} 1, & \forall f \in \mathcal{F} \\ 0, & \text{elsewhere}. \end{cases} \tag{14}$$

Note that, given a signal, different bandwidth-rate pairs result in different FRESH vectorizations in general. It can be easily seen that, given an arbitrary signal with bandwidth $B_0$, no information is lost during the vectorization if and only if $B \geq B_0$, i.e., the reference bandwidth is greater than or equal to the bandwidth of the signal. Note that this holds irrespective of the reference rate 1/T. In what follows, $B=B_0$ is assumed, unless otherwise specified.

Figure 2:
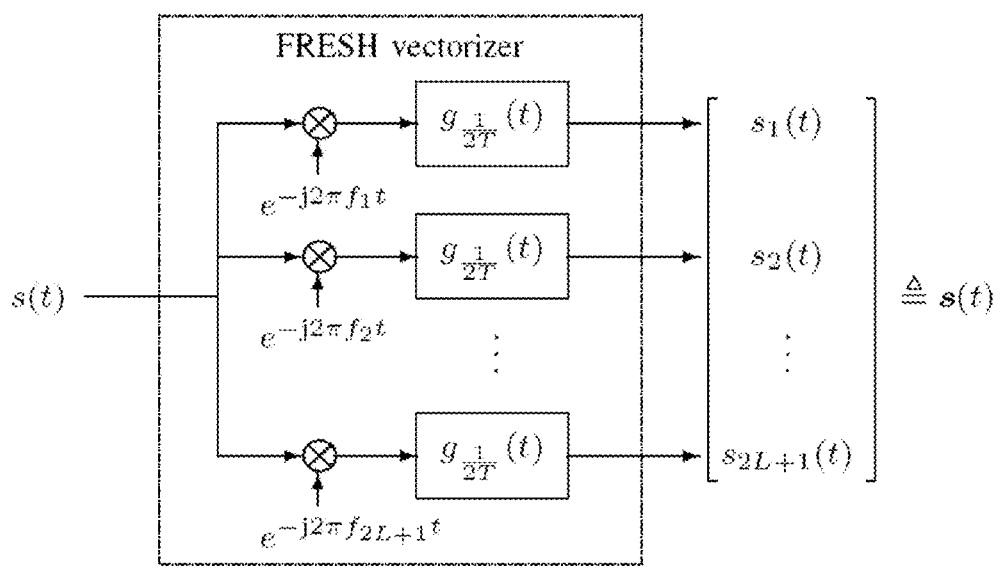
FIG. 2 shows FRESH vectorization viewed in the time domain.

FIG. 2 shows how a FRESH vectorizer works in the time domain, where a deterministic scalar-valued signal s(t) is converted to a vector-valued signal s(t) of length 2L+1. The FRESH vectorizer modulates s(t) with different carriers, of which frequencies are integer multiples of the reference rate 1/T, and lowpass filters to form a vector-valued signal s(t), of which entries are all strictly band-limited to the Nyquist zone $\mathcal{F}$.

Figure 3:
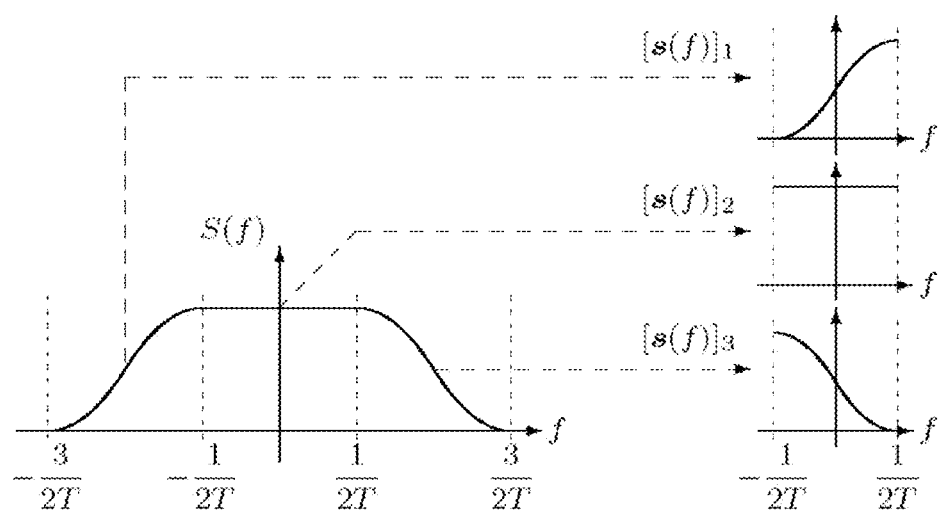
FIG. 3 shows FRESH vectorization viewed in the frequency domain for a deterministic signal.

FIG. 3 shows how a FRESH vectorizer works in the frequency domain. Let s(f) be the elementwise Fourier transform $$s(f) \triangleq \mathfrak{F}\{s(t)\} = \begin{bmatrix} \mathfrak{F}\{s_1(t)\} \\ \mathfrak{F}\{s_2(t)\} \\ \vdots \\ \mathfrak{F}\{s_{2L+1}(t)\} \end{bmatrix}, \tag{15a}$$

of s(t), where the argument f differentiates the frequency-function s(f) from the time-function s(t). Then, (13b) implies that the lth entry of s(f) is given by $$[s(f)]_l = S(f+f_l), \tag{15b}$$

for $f \in \mathcal{F}$ and for l=1, 2, ..., 2L+1, where S(f) is the Fourier transform of s(t). Thus, s(f) is nothing but the VFT of s(t).

Figure 4:
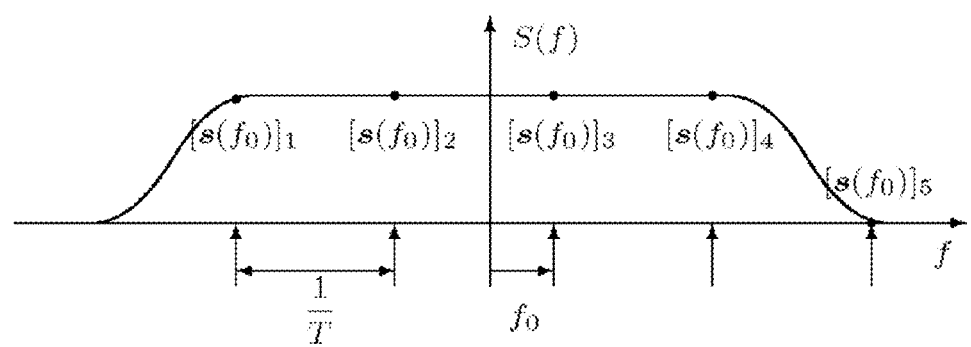
FIG. 4 shows frequency-domain sampling of the Fourier transform of the deterministic signal.

FIG. 4 reviews how to obtain the VFT from the Fourier transform. After forming a row vector by sampling the Fourier transform with sampling period 1/T and offset $f_0$, we can obtain the VFT in a column vector form at offset $f_0$ by rotating the row vector 90° clockwise.

B. FRESH Vectorization of a WSCS Random Process and MV-PSD

In this subsection, we especially consider the FRESH vectorization of a WSCS random process when the inverse of the reference rate 1/T is the same as an integer multiple of the fundamental cycle period $T_0$ of the random process. Note that, since any integer multiple of a cycle period is also a cycle period, the inverse T of the reference rate is a cycle period of the process in this case. It turns out that such a FRESH vectorization can best capture the time- and the frequency-domain correlation properties of a cyclostationary random process.

To proceed, we define superscripts $(\bullet)^T$ and $(\bullet)^H$ as transposition and conjugate transposition of a vector, respectively. Note that, since T is a cycle period of X(t), there exist functions $\{R_N^{(k)}(f)\}_{k \in \mathbb{Z}}$ such that $$R_N(f, f') = \sum_{k=-\infty}^{\infty} R_N^{(k)}\left(f - \frac{k}{T}\right) \delta\left(f - f' - \frac{k}{T}\right), \quad (16)$$

similar to (6).

Proposition 1: When the inverse of the reference rate 1/T is an integer multiple of $T_0$, the FRESH vectorization X(t) with reference pair (B,1/T) of a proper-complex zero-mean WSCS random process X(t) with bandwidth $B_0$ and fundamental cycle period $T_0$ is a proper-complex zero-mean vector-valued WSS process, i.e., $$\mathbb{E}\{X(t)\} = 0_{2L+1}, \forall t, \quad (17a)$$

$$\mathbb{E}\{X(t+\tau)X(t)^T\} = 0_{(2L+1) \times (2L+1)}, \forall t, \forall \tau, \quad (17b)$$

and there exists $r_X(\tau)$ such that $$\mathbb{E}\{X(t+\tau)X(t)^H\} = r_X(\tau), \forall t, \forall \tau, \quad (17c)$$

where $0_{2L+1}$ and $0_{(2L+1) \times (2L+1)}$ are a (2L+1)-by-1 and a (2L+1)-by-(2L+1) all-zero vector and matrix, respectively, and $r_X(\tau)$ is a (2L+1)-by-(2L+1) matrix-valued function.

If we take the Fourier transform of the (l,l')th entry of $r_X(\tau)$, then we have $$[R_X(f)]_{l,l'} \triangleq \Im\{[r_X(t)]_{l,l'}\} = R_X^{(l-l')}(f + f_l), \quad (18)$$

which is nothing but the (l,l')th entry of the MV-PSD of X(t) when $B \geq B_0$. Therefore, as the FRESH vectorization of a deterministic signal forms a Fourier transform pair with its VFT, the auto-correlation matrix-valued function of a WSCS random process forms a Fourier transform pair with its MV-PSD.

Figure 5:
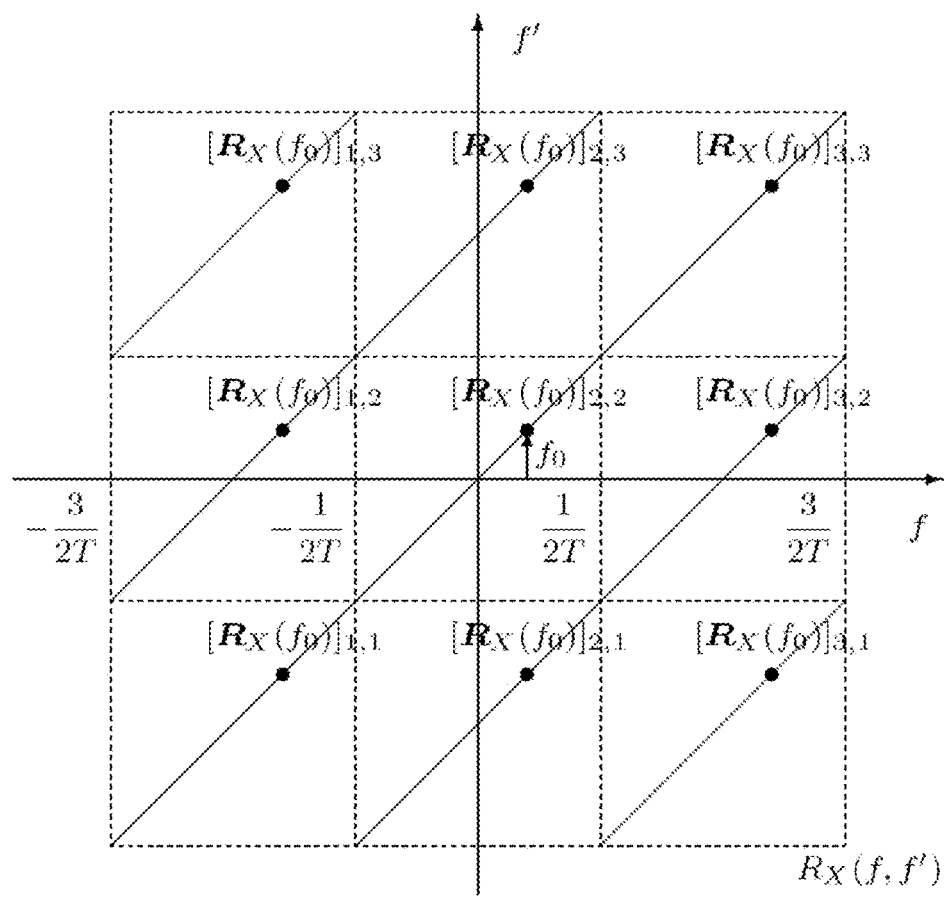
FIG. 5 shows 2-dimensional frequency-domain sampling of the double Fourier transform to construct the matrix-valued PSD (MV-PSD) of a cyclostationary random process.

FIG. 5 reviews how to obtain the MV-PSD from the double Fourier transform that consists of impulse fences. Similar to the construction of the VFT, we can obtain the MV-PSD at offset $f_0$ by 2-D sampling the double Fourier transform with sampling period 1/T and offset $f_0$ to form a matrix and, then, by rotating the matrix 90° clockwise. The major difference from the VFT is that the sampled value is the height of the impulse fence at the sampling point, not the value of the double Fourier transform, which is either infinity or zero. Since they are identical, we simply call in what follows the Fourier transform $R_X(f)$ of the auto-correlation function of a FRESH vectorization X(t) the MV-PSD of X(t).

Before moving to the reverse operation of the FRESH vectorization, we point out one important property of the MV-PSD of a WSCS random process.

Lemma 1: Given a bandwidth-rate pair (B,1/T), the MV-PSD $R_X(f)$ of a WSCS random process X(t) with cycle period T is a Hermitian-symmetric positive semi-definite matrix for all $f \in \mathcal{F}$..

C. FRESH Scalarization

In this subsection, we introduce FRESH scalarization.

Definition 4: The FRESH scalarization of X(t) is defined as the reverse operation of the FRESH vectorization, i.e., $$X(t) \triangleq \sum_{l=1}^{2L+1} X_l(t) e^{j2\pi f_l t}. \quad (19)$$

where $L = \left\lceil \frac{2BT-1}{2} \right\rceil$, lth shifting frequency $$f_l = \frac{l-L-1}{T},$$

B is a bandwidth, and $X_l(t)$ is lth entry of the vector X(t). The vector-valued random process X(t) is shifted in frequency domain and then each entry of the shifted vector is combined. Before combining, the shifted vector is processed by a multi-input multi-output (MIMO) scheme which is well known in the art.

Figure 6:
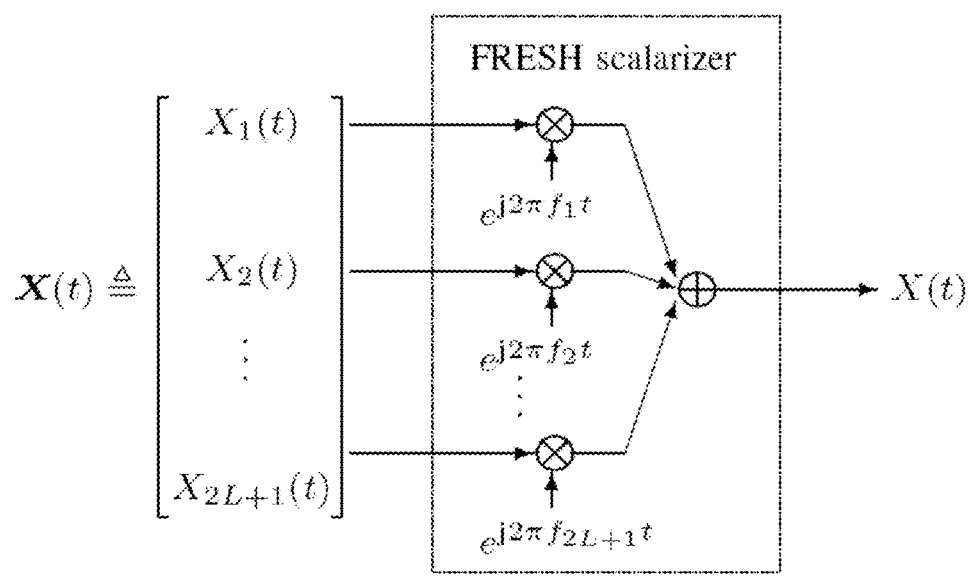
FIG. 6 shows FRESH scalarization viewed in the time domain.

When viewed as a representation of a WSCS random process X(t), the right-side of (19) is called the harmonic series representation (HSR) of X(t). FIG. 6 shows how a FRESH scalarizer works in the time domain, where the vector-valued random process X(t) of length 2L+1 is converted to a scalar-valued random process X(t). In the frequency domain, the FRESH scalarizer frequency-shifts each entry $X_l(t)$ of X(t) back to the lth Nyquist zone $\mathcal{F}_l$ and constructs a scalar-valued random process X(t), which is the reverse operation of what is shown in FIG. 3. The FRESH scalarization of a deterministic signal can also be similarly defined.

3. Cyclic Water-Filling and Capacity of WSCS Gaussian Noise Channel

In this section, the capacity of the WSCS Gaussian noise channel is derived. An optimization problem is formulated to find the maximum achievable data rate between the channel input and the output with arbitrary small error rate, and it is shown that the capacity-achieving transmit signal is a WSCS Gaussian random process with the same cycle period as the cyclostationary interference.

A. Conversion to Equivalent MIMO Channel

The input-output relation of the channel in complex baseband is given by Y(t)=h(t)*X(t)+N(t). In this subsection, we shows that, when $B \geq B_0$, this single-input single-output (SISO) channel with X(t) and Y(t) as its input and output, respectively, is equivalent to the multi-input multi-output (MIMO) channel with their FRESH vectorizations X(t) and Y(t) as the channel input and output, respectively.

Proposition 2: The FRESH vectorizations Y(t) of the channel Y(t) can be rewritten as $$Y(t) = \text{diag}\{h(t)\} * X(t) + N(t), \quad (20)$$

where Y(t), h(t), X(t), and N(t) are the FRESH vectorizations of Y(t), h(t), X(t), and N(t), respectively, and diag{h(t)} denotes a diagonal matrix having the lth diagonal entry equal to the lth entry of h(t).

Figure 7:
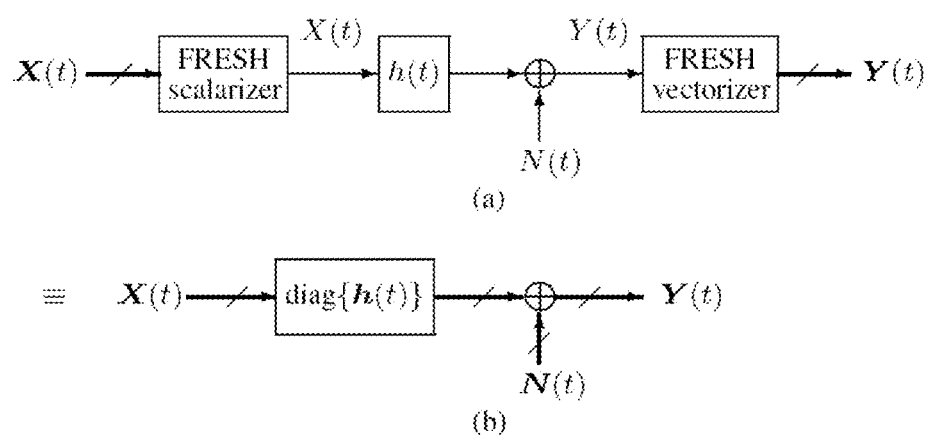
FIG. 7 shows (a) conversion of a SISO channel to an equivalent MIMO channel by using a FRESH scalarizer and a FRESH vectorizer and (b) equivalent MIMO channel with vector valued colored noise.

Regardless of the choice of the reference rate 1/T, if the reference bandwidth is chosen to satisfy $B \geq B_0$, then the FRESH vectorization of the channel output becomes a sufficient statistic, i.e., Y(t) does lose any information in Y(t). Thus, Proposition 2 implies that the SISO channel of the equation (1) can be converted to an equivalent MIMO channel of the equation (20) by placing the FRESH scalarizer and the FRESH vectorizer, respectively, at the input and the output of the SISO channel, as shown in FIG. 7-(a). As shown in FIG. 7-(b), this MIMO channel is much simpler than general MIMO channels intensively investigated for the applications to multi-antenna wireless communications in that the channel matrix diag{h(t)} is always diagonal, but more complicated in that the additive noise vector N(t) is colored and, consequently, the elements are statistically dependent.

If we choose the inverse of the reference rate 1/T the same as an integer multiple of the fundamental cycle period $T_0$ of the proper-complex WSCS noise, then the FRESH vectorization Ñ(t) of the WSCS Gaussian noise becomes a proper-complex vector WSS random process, of which correlation properties are concisely captured in the MV-PSD. Therefore, in what follows, we assume $$B = B_0 \text{ and } f = f_0 \qquad (21)$$

for the FRESH vectorizer and the scalarizer used in the MIMO conversion of the SISO channel for sufficiency and simplicity.

B. Noise Whitening and Problem Re-Formulation

Since the capacity of MIMO additive Gaussian noise channels with diagonal or scaled identity correlation matrices is well known, we consider whitening the vector WSS Gaussian random process N(t). To proceed, we review the notions of effective VFT, effective MV-PSD, and degree of freedom.

Definition 5: (a) Given a deterministic signal s(t) with bandwidth B, the effective VFT with a bandwidth-rate pair (B,1/T), is defined as a variable-length vector-valued function of f that is obtained after removing the first entry of the ordinary VFT s(f) for $$-\frac{1}{2T} \leq f < -\frac{1+\beta}{2T} + \frac{L}{2T}, \qquad (22a)$$

and the last entry for $$\frac{1+\beta}{2T} - \frac{1}{2T} < f \leq \frac{L}{2T}. \qquad (22b)$$

(b) Given a WSCS random process X(t) with bandwidth $B_0$ and the fundamental cycle period $T_0$, the effective MV-PSD with a bandwidth-rate pair $(B,1/T)=(B_0,1/T_0)$ is defined as a variable-size matrix-valued function of f that is obtained after removing the first row and the first column of the ordinary MV-PSD $R_X(f)$ for f satisfying the condition (22a) and the last column of for f satisfying the condition (22b).

We denote the length of an effective VFT as $\mathcal{N}(f)$ and call it the degree of freedom at f. Then, an effective MV-PSD becomes $\mathcal{N}(f)$-by-$\mathcal{N}(f)$. It is known that $\mathcal{N}(f)$ is given by $$\mathcal{N}(f) = \begin{cases} 1 + \lceil \beta \rceil, & \text{for } |f| < \frac{1+\beta-\lceil \beta \rceil}{2T} \\ \lceil \beta \rceil, & \text{otherwise}, \end{cases} \qquad (23a)$$

for even $\lceil \beta \rceil$, and $$\mathcal{N}(f) = \begin{cases} \lceil \beta \rceil, & \text{for } |f| < \frac{\lceil \beta \rceil - \beta}{2T} \\ 1 + \lceil \beta \rceil, & \text{otherwise}, \end{cases} \qquad (23b)$$

for odd $\lceil \beta \rceil$, where $\beta$ is the excess bandwidth.

This removal of the entries in the ordinary VFT and MV-PSD is necessary because, when we design a band-limited signal s(t) or a band-limited WSCS random process X(t), not every entry in s(f) or $R_X(f)$ are free variables if B<1/(2T)+L/T. For notational simplicity, we do not introduce new notations for effective VFT and MV-PSD. In what follows, the VFTs and the MV-PSDs are all effective ones, unless otherwise specified.

Proposition 3: Let a matrix-valued whitening filter W(t) be a (2L+1)-by-(2L+1) matrix-valued function of t defined as $$W(t) \triangleq \mathfrak{F}^{-1}\{R_N(f)^{-\frac{1}{2}}\}, \qquad (24)$$

where $$R_N(f)^{-\frac{1}{2}}$$

is the square root of the MV-PSD of N(t) and $\mathfrak{F}^{-1}\{\bullet\}$ is the entry-by-entry inverse Fourier transform. Then, the MV-PSD of $$\tilde{N}(t) \triangleq W(t) * N(t) \qquad (25)$$

is given by $$R_{\tilde{N}}(f) = I_{\mathcal{N}(f)}, \qquad (26)$$

where $I_{\mathcal{N}(f)}$ is the $\mathcal{N}(f)$-by-$\mathcal{N}(f)$ identity matrix-valued function of f.

This whitening filter W(t) plays a crucial role in formulating and solving the optimization problem to find the capacity of the channel in the frequency domain. The noise component at a receiver has a correlation in frequency domain in view of a noise vector after vectorization. This means the off-diagonal entries of the MV-PSD $R_N(f)$ are not zero. A receive signal in which the noise is included is process by the whitening filter W(t) to decorrelate the noise. By using the whitening filter W(t), a MIMO channel with correlated noises is converted into a MIMO channel with decorrelated noises.

Theorem 1: The optimization problem to find the capacity of the WSCS Gaussian channel (1) is given by Problem 1:

$$\max_{(R_X(f))_f} \int_{\mathcal{F}} \log_2 \det\{I_{\mathcal{N}(f)} + \tilde{H}(f) R_X(f) \tilde{H}(f)^H\} df \qquad (27a)$$

$$\text{subject to } \int_{\mathcal{F}} tr\{R_X(f)\} df = P, \qquad (27b)$$

where $R_X(f)$ is the positive semi-definite $\mathcal{N}(f)$-by-$\mathcal{N}(f)$ MV-PSD of a Gaussian random process X(t), and $\tilde{H}(f)$ is defined as $$\tilde{H}(f) \triangleq R_N(f)^{-1/2} H(f), \qquad (28)$$

where H(f)=diag{h(f)}.

C. Optimal Solution and its Property

In this subsection, the optimal solution to Problem 1 is derived and its property is investigated.

Theorem 2: Let a MV-PSD $R_{\tilde{X},opt}(f)$ be an $\mathcal{N}(f)$-by-$\mathcal{N}(f)$ diagonal matrix whose the nth diagonal entry is given by $$[R_{\tilde{X},opt}(f)]_{n,n} \triangleq \left[ v_{opt} - \frac{1}{\gamma_n(f)^2} \right]^+, \qquad (29a)$$

where $v_{opt}$ is the unique solution to $$\int_{\mathcal{F}} \sum_{n=1}^{N(f)} \left[ v_{opt} - \frac{1}{\gamma_n(f)^2} \right]^+ df = P, \quad (29b)$$

with $\gamma_n(f)$ being the nth singular value of the equivalent channel matrix $\tilde{H}(f)$ and $[x]^+ = (x+|x|)/2$ denoting the positive part of x. Then, the optimal solution to Problem 1 is given by $$R_{X,opt}(f) = V(f) R_{\tilde{X},opt}(f) V(f)^H, \quad (30)$$

and, consequently, the capacity of the WSCS Gaussian noise channel (1) is given by $$C_{WSCS} = \int_{\mathcal{F}} \sum_{n=1}^{N(f)} \log_2(1 + [\gamma_n(f)^2 v_{opt} - 1]^+) df. \quad (31)$$

We call this water-filling described in Theorem 2 the cyclic water-filling (CWF) because the resultant optimal transmit signal is cyclostationary, which is proven in the following theorem. The MV-PSD $R_{\tilde{X},opt}(f)$ is determined using the water-filling scheme based on singular values of the equivalent channel matrix $\tilde{H}(f)$. To proceed, we define the optimal transmit signal as $$X_{opt}(t) \triangleq \sum_{l=1}^{2L+1} X_{l,opt}(t) e^{j2\pi f_l t}, \quad (32)$$

where $X_{l,opt}(t)$ is the lth entry of the FRESH vectorization $\mathbf{X}_{opt}(t)$ of $X_{opt}(t)$.

Theorem 3: $X_{opt}(t)$ is a proper-complex WSCS Gaussian random process with cycle period $T_0$.

Even without the Gaussianity of the random process, this theorem still shows that, if a vector proper-complex WSS random process with bandwidth $B_0$ is FRESH scalarized with reference pair $(B_0, 1/T_0)$ the resulting scalar-valued random process always becomes a proper-complex WSCS random process with cycle period $T_0$.

4. Cyclic Water-Filling Under Zero-Interference Constraint

In this section, two cases are mainly considered that naturally impose zero-interference constraints. It turns out that such constraints can be easily accommodated by the solution derived in the previous section, if the channel impulse response is simply re-defined. Consequently, the optimal transmit signal to achieve the capacity under the zero-interference constraints is again a WSCS Gaussian random process. Since the zero-interference constraints may result in no feasible solution, a necessary and sufficient condition for the existence of the solution is also investigated.

A. Zero-Interference to Co-Channel Users

Figure 8:
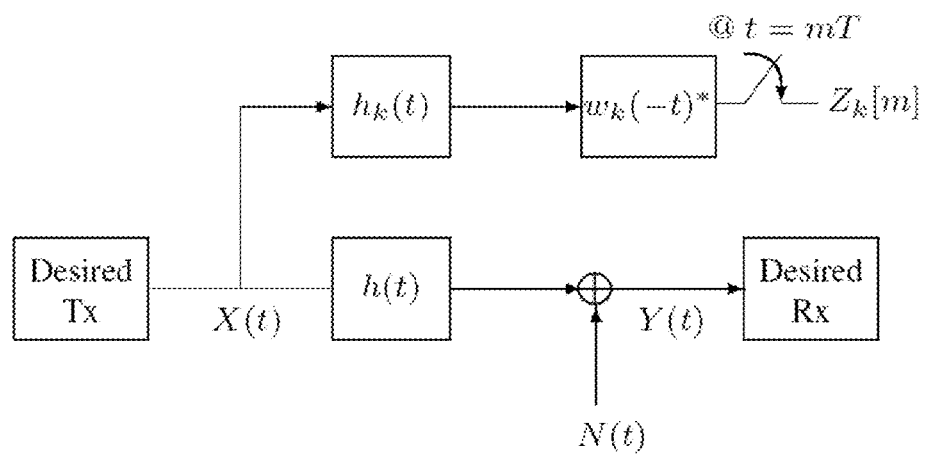
FIG. 8 shows the system block diagram for the scenario in which the legacy transmitter-receiver pair and the overlay system.

In what follows, we consider the multiuser case in which there are K legacy transmitter-receiver pair in a permissible transmission range, as shown in FIG. 8. The legacy receivers consist of a linear receive-filter followed by a sampler. In this communication network, there is an overlay transmitter-receiver pair, which makes additional communication links. It is possible for an overlay transmitter to induce the unwanted interference to legacy receivers which are in a permissible transmission range of an overlay transmitter. In this subsection, our goal is at once to maximize the channel capacity of an overlay system in existence of legacy users with the constraint to make no interference to all legacy receivers. To analyze the induced interference to legacy receivers, we assume that $w_k(-t)^*$ is the impulse response of receive filter in the kth legacy receiver. Then, the channel output $Z_k(t)$ of the kth legacy user is passed through $w_k(-t)^*$ and sampled at $t=mT$ to form the sampled output given by $$Z_k[m] \triangleq X(t) * h_k(t) * w_k(-t)^*|_{t=mT} = X(t) * p_k(-t)^*|_{t=mT}, \quad (33)$$

where $p_k(-t)^* \triangleq h_k(t) * w_k(-t)^*$. In what follows, the zero-interference means the sampled output after filtered through a linear receive filter is zero, that is, $Z_k[m]=0$, $\forall m$, in (33).

B. Problem Formulation and Optimal Solution

In this subsection, we modify the optimization problem to adapt the zero-interference constraint (33) and derive the optimal solution to Problem. 1. For the mathematical refinement, the quadratic orthogonality constraint is induced from (33) by the following lemma.

Lemma 2: The zero interference constraint (33) is equivalent to $$p_k(f)^H R_X(f) p_k(f) = 0, \ \forall f \in \mathcal{F}, \forall k, \quad (34)$$

where $R_X(f)$ is the MV-PSD of $X(t)$ and $p_k(f)$ is the VFT of $p_k(t)$.

By combining Problem. 1 and lemma 2, we have the optimization problem formulated as Problem 2:

$$\max_{(R_X(f))_f} \int_{\mathcal{F}} \log_2 \det\{I_{N(f)} + \tilde{H}(f) R_X(f) \tilde{H}(f)^H\} df \quad (35a)$$

$$\text{subject to } p_k(f)^H R_X(f) p_k(f) = 0, \ \forall f \in \mathcal{F}, \forall k, \quad (35b)$$

$$\int_{\mathcal{F}} tr\{R_X(f)\} df = P. \quad (35c)$$

To coordinate the orthogonal constraints systematically, we define the blocking matrix $B(f)$ as $B(f)=[p_1(f) \ldots p_K(f)]$. We also define a projection matrix $P_B(f)$ and the orthogonal projection matrix $P_B^\perp(f)$ of $B(f)$ as $$P_B(f) \triangleq B(f)(B(f)^H B(f))^\dagger B(f)^H \quad (36)$$

and $$P_B^\perp(f) \triangleq I_{N(f)} - P_B(f) \quad (37)$$

respectively, where the superscript † denotes the pseudo-inverse.

Lemma 3: The matrix-valued PSD $R_X(f)$ of $X(t)$ satisfies the quadratic orthogonality constraint (34) if it satisfies the relation $$R_X(f) = P_B^\perp(f) R_X(f) P_B^\perp(f)^H. \quad (38)$$

Using above lemma, we can convert Problem. 2 as shown in the following proposition.

Proposition 4: Problem 2 with two constraints is equivalent to

Problem 3:

$$\max_{(R_X(f))_f} \int_{\mathcal{F}} \log_2 \det\{I_{N(f)} + \hat{H}(f) R_X(f) \hat{H}(f)^H\} df \quad (39a)$$

-continued $$\text{subject to } \int_{\mathcal{F}} tr\{R_X(f)\}df = P, \qquad (39b)$$

which has only one constraint, where $$\hat{H}(f) \triangleq \tilde{H}(f)P_B^\perp(f) = R_N(f)^{-\frac{1}{2}}H(f)P_B^\perp(f).$$

This proposition has the following immediate consequence.

Theorem 4: The capacity of the WSCS Gaussian noise channel with zero interference constraint is given by (33), now with $\gamma_n(f)$ defined as the n th singular value of the matrix $\hat{H}(f)$.

C. Necessary and Sufficient Condition for Existence of Optimal Solution

The final question to be answered is what is the necessary and sufficient condition for the existence of a non-trivial optimal solution. In this subsection, we show that the existence of a non-trivial optimal solution can be determined solely by the orthogonality constraint (33). Note that the result is not trivial because $R_N(f)$ is positive definite.

Theorem 5: A necessary and sufficient condition for the existence of a non-trivial optimal solution is that the length of the set $\{f \in \mathcal{F} : H(f)P_B^\perp(f) \neq 0_{\mathcal{N}(f)}\}$ is positive.

Note that H(f) is a diagonal matrix whose diagonal entries are the elements of h(f), the VFT of h(t). If all of diagonal entries of H(f) are nonzero, the condition $H(f)P_B^\perp(f)=0_{\mathcal{N}(f)}$ means $P_B^\perp(f)=0_{\mathcal{N}(f)}$, which also implies that the dimension of a null space of B(f) is zero. Thus, assuming that all of diagonal entries of H(f) are nonzero, the overlay can transmit no signal under zero interference constraint if the rank of B(f) is full.

5. Numerical Results

In this section, we provide discussions and numerical results related to the previous section. For simplicity, all channels are assumed flat.

A. Cyclic Water-Filling Vs. Ordinary Water-Filling

The first numerical result is the comparison of the CWF and by the ordinary water-filling (OWF). For this purpose, we consider the cases where the interference to the desired system comes from the legacy system employing linear modulation with a square-root Nyquist pulse of roll-off factor $0<\beta\leq 1$, symbol rate $1/T=W/(1+\beta)$, symbols from a Gaussian codebook, and transmission power $P_1$.

In this case, the desired system overlays to the legacy system and does not necessarily employ linear modulation, but has an average power of $P_2$. By the CWF, the spectral efficiency is given by $$C_{CWF}(P_2) = W\log_2\left(1 + \frac{P_1 + P_2}{N_0 W}\right) - \frac{W}{1+\beta}\log_2\left(1 + \frac{(1+\beta)P_1}{N_0 W}\right)[bps]. \qquad (40)$$

Figure 9:
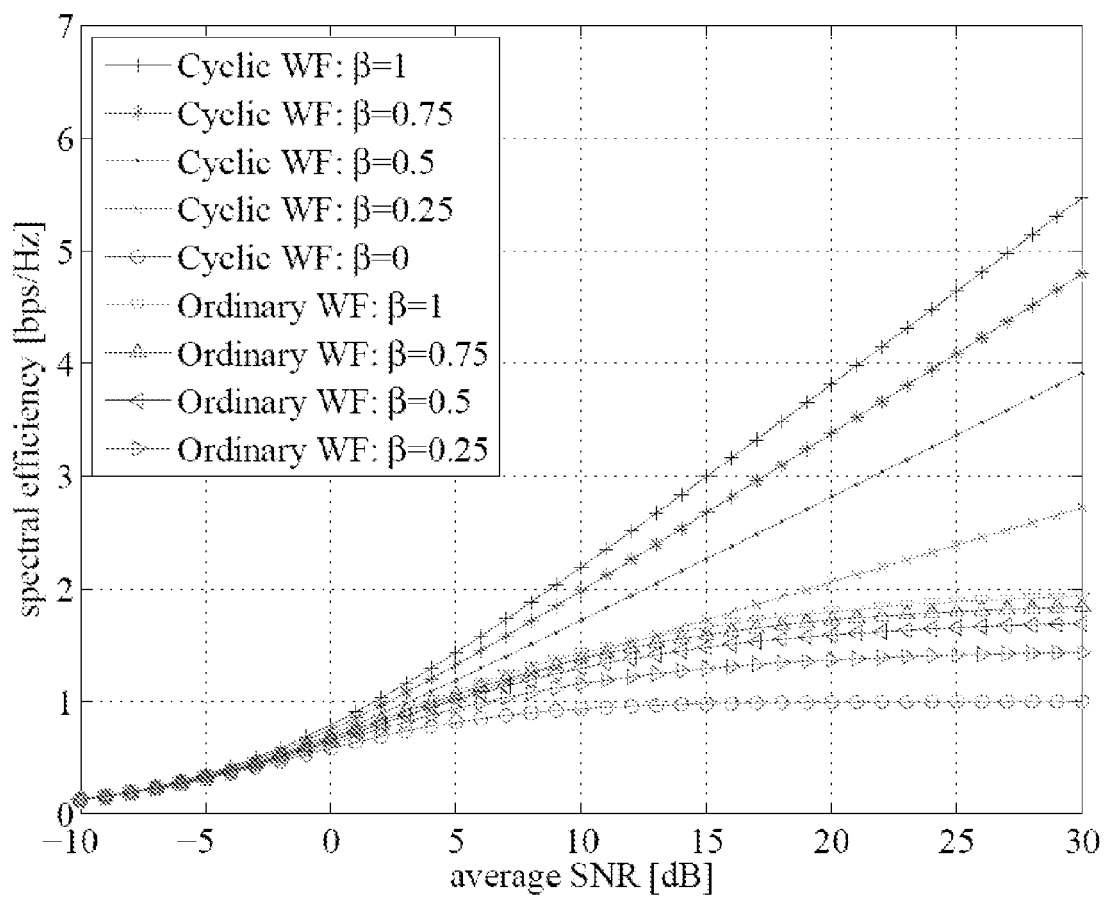
FIG. 9 shows the comparison of the spectral efficiencies achieved by the CWF and by the OWF.

FIG. 9 compares the spectral efficiency of the WSCS Gaussian noise channel obtained by using the CWF and the OWF. The interference-to-signal power ratio (ISR) $P_1/P_2$ is 0 [dB], and the excess bandwidth of the legacy signal is $\beta=[0, 0.25, 0.5, 0.75, 1]$. Note that the spectral efficiency is shown as a function of the signal-to-noise ratio $P_2/N_0 W$. As shown in the figure, the CWF significantly outperforms the OWF.

Figure 10:
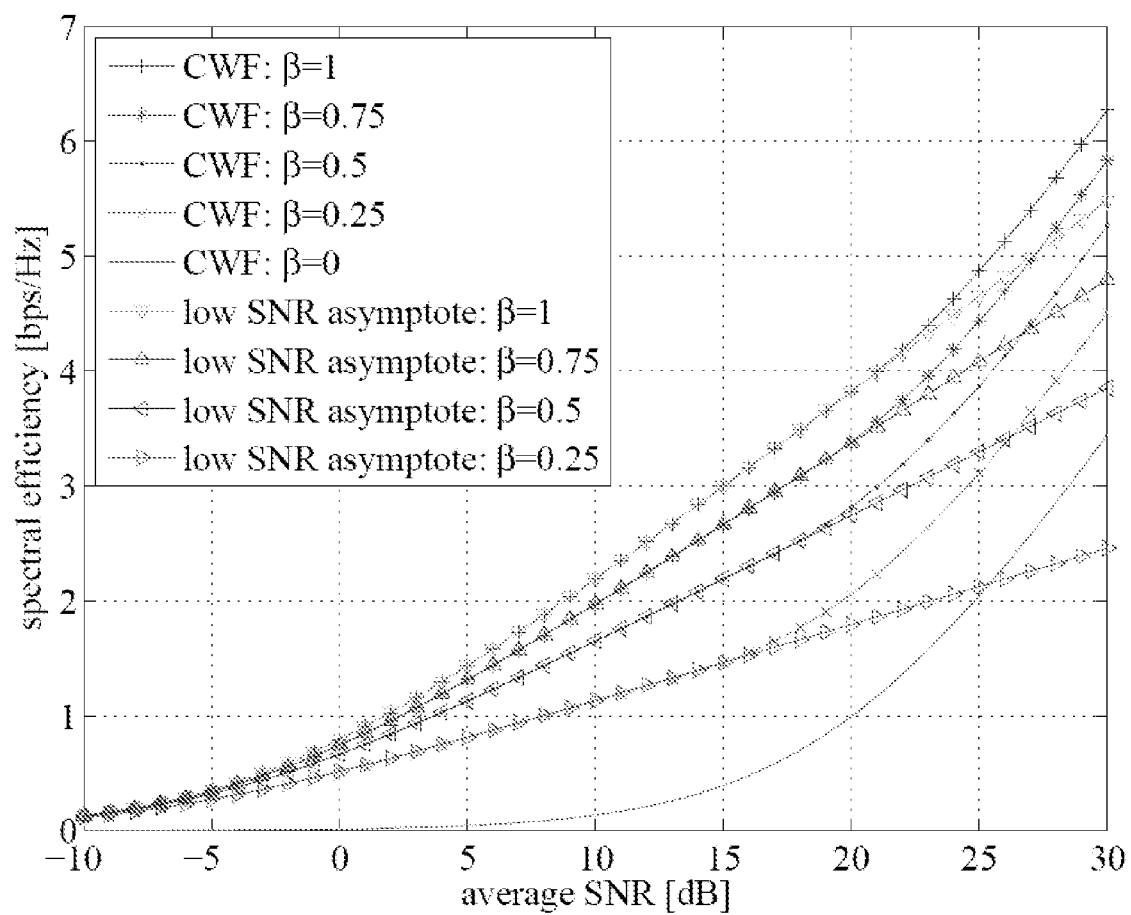
FIG. 10 shows the low SNR asymptote of the spectral efficiencies achieved by the CWF.

In FIG. 10, the low SNR asymptote of the spectral efficiencies achieved by the CWF when the interference-to-noise power ratio (INR) is 20 [dB] is given. The low SNR asymptote is given by $$C_{asymptote}(P_2) = \frac{\beta}{1+\beta}W\log_2\left(1 + \frac{P_2}{\frac{\beta}{1+\beta}N_0 W}\right)[bps]. \qquad (41)$$

As shown in the figure, the CWF achieves the low SNR asymptote in the low SNR regime.

If the overlay transmit power of CFW and the low SNR asymptote are $P_{2,CWF}(C)$ and $P_{2,asymptote}(C)$ for a given spectral efficiency C, then $P_{2,CWF}(C)$ and $P_{2,asymptote}(C)$ are given by $$P_{2,CWF}(C) = N_0 W\left\{\left(1 + \frac{(1+\beta)P_1}{N_0 W}\right)^{\frac{1}{1+\beta}} \cdot 2^{\frac{C}{W}} - 1\right\} - P_1 \qquad (42a)$$

$$P_{2,asymptote}(C) = \frac{\beta}{1+\beta}N_0 W\left(2^{\frac{1+\beta}{\beta}\frac{C}{W}} - 1\right) \qquad (42b)$$

from (40) and (41), and the SNR margin $$\Delta(C) \triangleq \frac{P_{2,asymptote}(C)}{P_{2,CWF}(C)}$$

is given by $$\Delta(C) = \frac{\beta}{1+\beta} \cdot \frac{2^{\frac{1+\beta}{\beta}\frac{C}{W}} - 1}{\left\{\left(1 + \frac{(1+\beta)P_1}{N_0 W}\right) \cdot 2^{\frac{C}{W}} - 1\right\} - \frac{P_1}{N_0 W}} \qquad (43)$$

Figure 11:
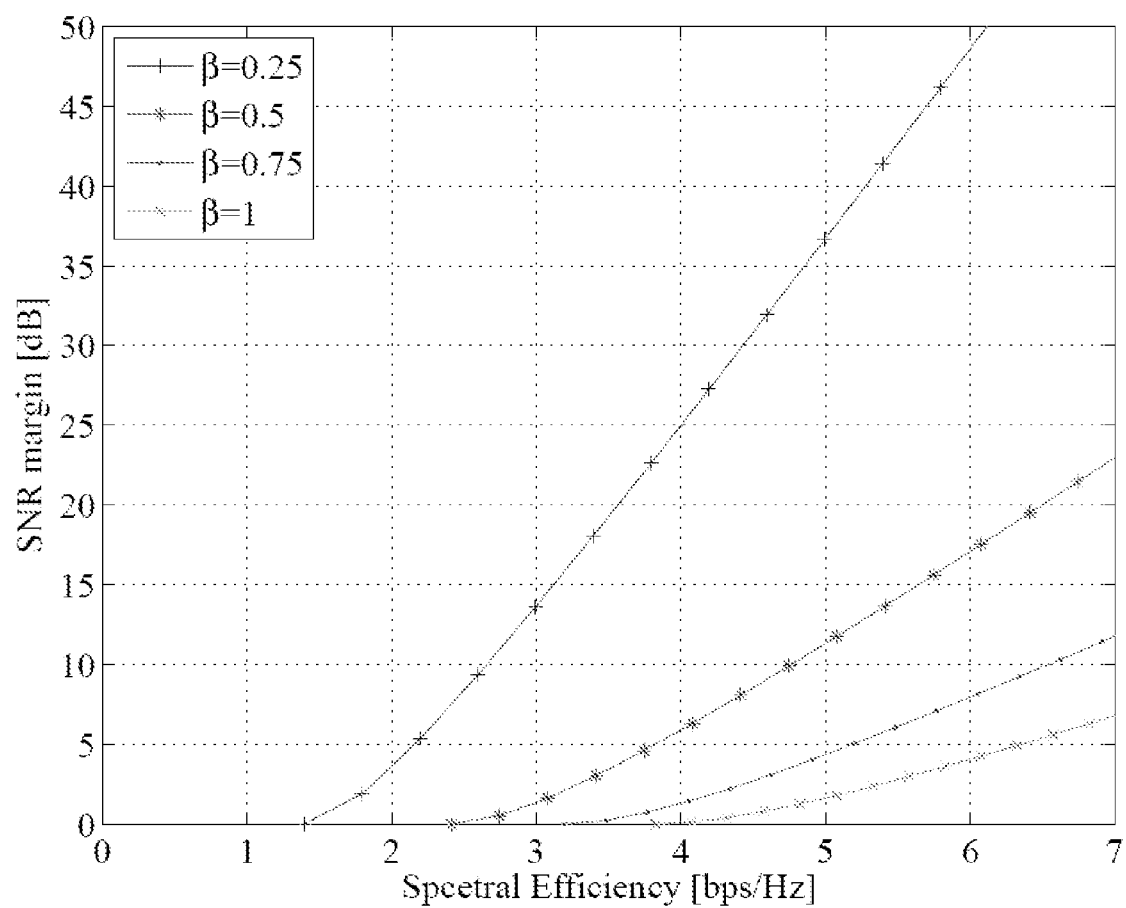
FIG. 11 shows the spectral efficiencies achieved by the CWF and its low SNR asymptote versus SNR margin.

Note that SNR margin is related to not the pulse shape but roll-off factor of a square-root Nyquist pulse in legacy user. FIG. 11 shows the SNR margin when the INR is 20 [dB].

Figure 12:
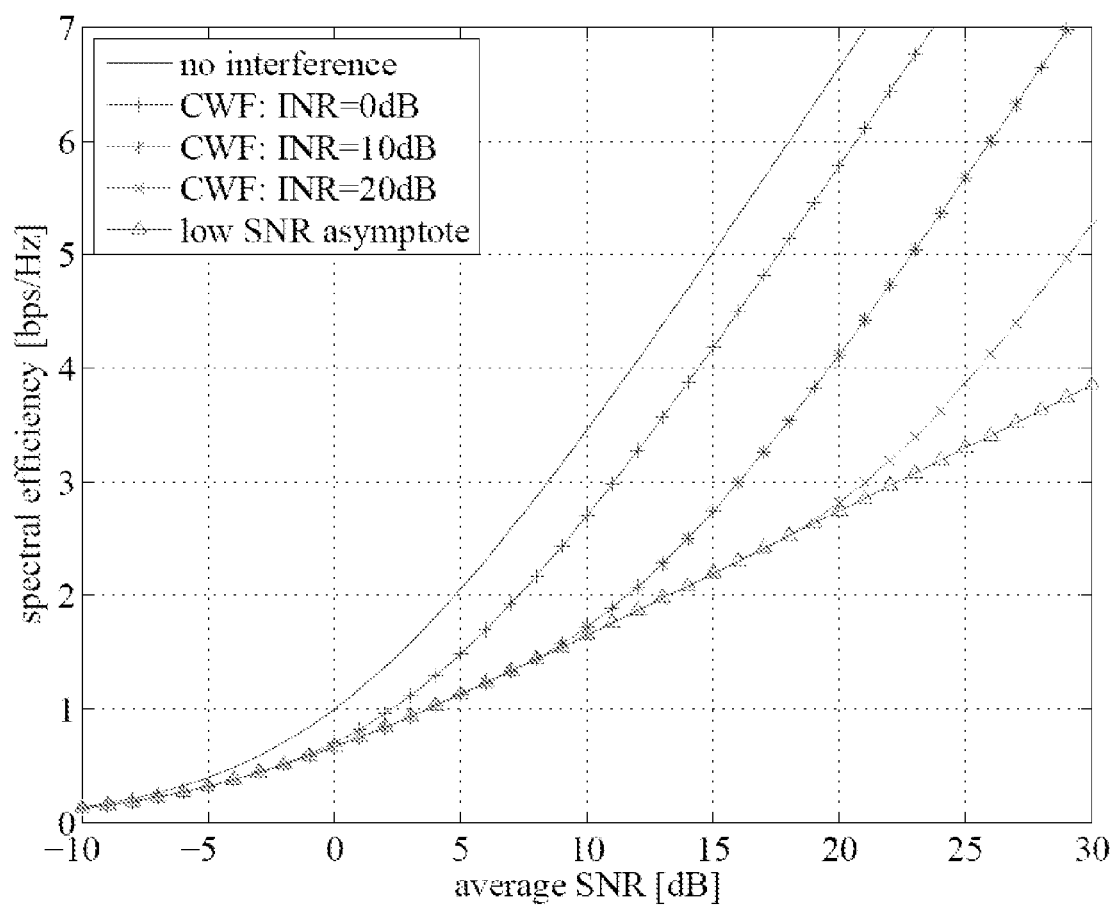
FIG. 12 shows the high SNR asymptote of the spectral efficiencies achieved by the CWF.

In the other hand, when SNR is high, the CWF achieves the logarithmic growth rate of the spectral efficiencies. FIG. 12 shows the high SNR asymptote of the spectral efficiencies of the CWF. The excess bandwidth of the desired system is $\beta=0.5$. In the high SNR regime, the CWF achieves the logarithmic growth rate of the high SNR asymptotes, W.

B. Cyclic Water-Filling Vs. Orthogonal Cyclic Water-Filling

The second numerical result is the comparison of the CWF and the orthogonal CWF (OCWF). The same signal model is adopted for the legacy system. The overlay system is assumed to have the knowledge on the symbol timing of the legacy receiver. This assumption is viable, for example, when an orthogonal overlay system is designed for a bent-pipe satellite broadcasting system. In such a system, the multiple legacy and overlay receivers can be regarded as collocated receivers, and the terrestrial station that transmits the overlay signal may monitor the downlink signal to acquire an accurate channel estimation.

Figure 13:
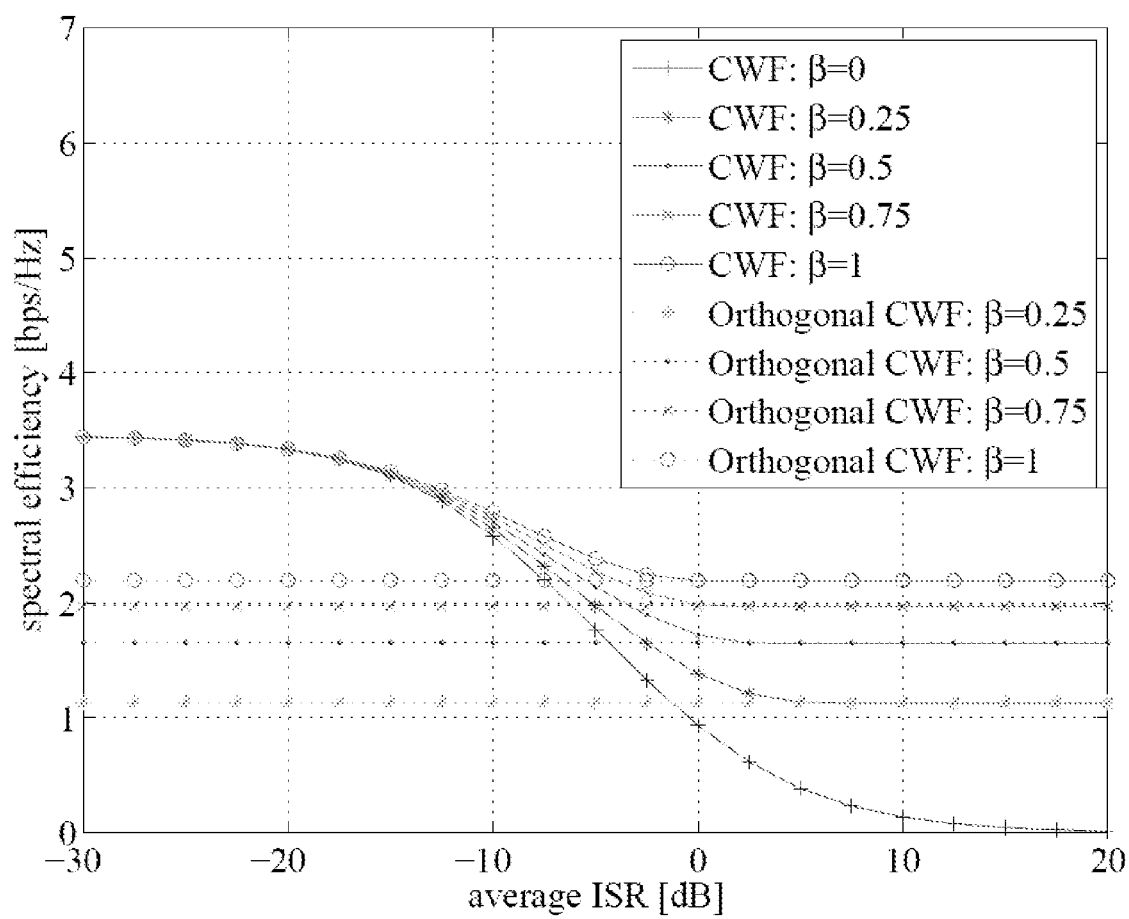
FIG. 13 shows the spectral efficiencies as a function of the ISR.

FIG. 13 shows the spectral efficiency of the WSCS Gaussian noise channel as a function of the ISR, when the CWF and the OCWF are used. The SNR is 10 [dB] and the excess bandwidth of the legacy signal is $\beta=[0, 0.25, 0.5, 0.75, 1]$ An interesting observation can be made that, if $\beta>0$, there is an ISR value over which the spectral efficiency of the CWF no longer decreases and equals to that of the OCWF, even though the interference power increases. This phenomenon occurs because even the selfish overlay signal utilizes only the subspace that is orthogonal to that of the legacy signal when the ISR is greater than or equal to a certain level. Thus, it observes an effectively interference-free frequency band of a reduced bandwidth.

C. Application to Orthogonal Multiple-Access Communications

The next application is to orthogonal multiple-access communications. When the first user employs linear modulation with a square-root Nyquist pulse with excess bandwidth $\beta > 0$, it can be shown that the second user orthogonal to the first user has the effective bandwidth $W\beta/(1+\beta)$ out of W. Since the throughput of the first user is given by $$C_1 = \frac{W}{1+\beta} \log_2\left(1 + \frac{(1+\beta)P_1}{N_0 W}\right), \quad (44)$$

which is the capacity of an FDMA user that occupies $W/(1+\beta)$ of W and that of the overlay user is given by $$C_2 = \frac{\beta W}{1+\beta} \log_2\left(1 + \frac{P_2}{N_0 \frac{\beta W}{1+\beta}}\right), \quad (45)$$

regardless of the choice of the reference rate $1/T=1/(KT_0)$, the first and the second users act like optimal FDMA users.

Figure 14:
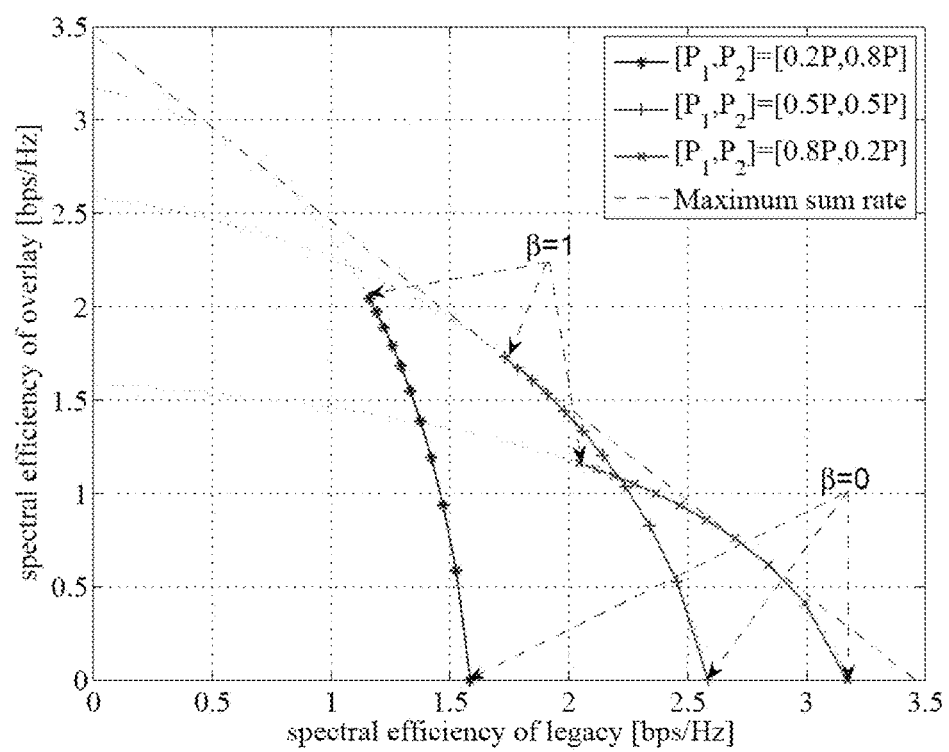
FIG. 14 shows the achievable rate pair of legacy and orthogonal overlay for roll-off factor $\beta\in[0,1]$.

FIG. 14 shows the normalized rate pairs of the users obtained by using the OCWF. The total SNR is $(P_1+P_2)/(N_0 W)=10$ [dB]. The rate pair always achieves a boundary point of the optimal FDMA rate region. The rate pair achieves the maximum sum rate if and only if $P_1:P_2=1:\beta$.

Figure 15:
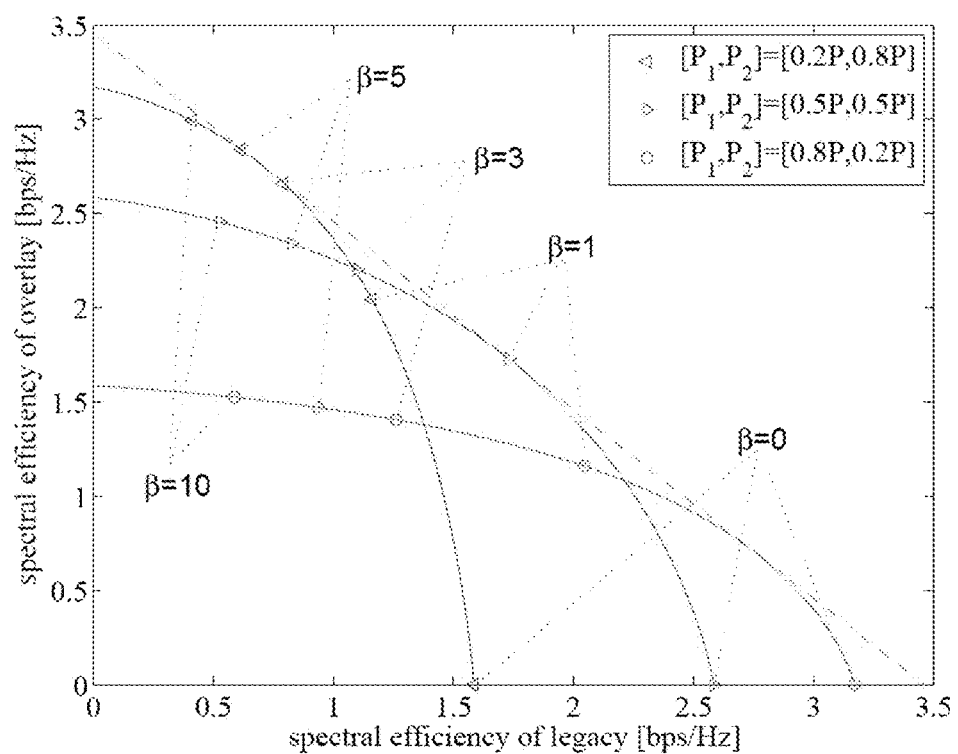
FIG. 15 shows the achievable rate pair of legacy and orthogonal overlay for roll-off factor $\beta\in[0,\infty)$.

FIG. 15 is the expansion of FIG. 14 to $\beta \in [0, \infty)$. Note that all the boundary points of the optimal FDMA rate region are achievable. User 1 has a square-root Nyquist transmit pulse with roll-off factor $\beta \in [0, \infty)$. The rate pair achieves the maximum sum rate if and only if $P_1:P_2=1:\beta$. Extension to multiple-user cases is straightforward.

Figure 16:
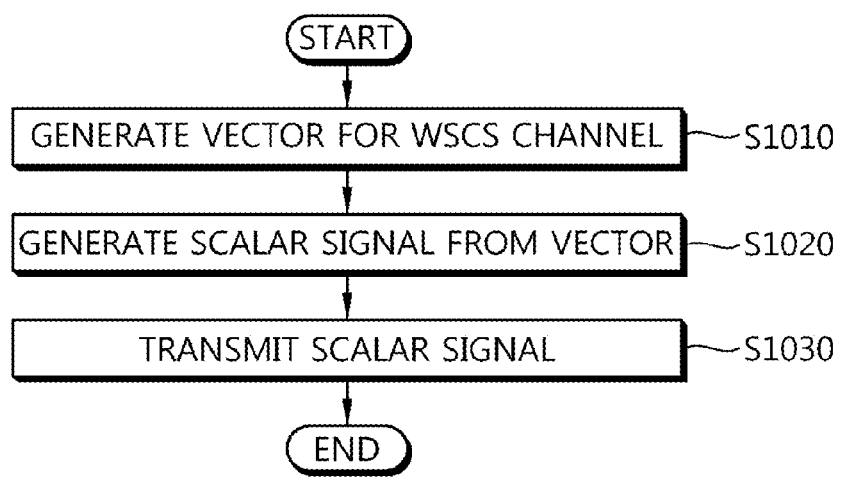
FIG. 16 shows a flow chart showing a method of transmitting data according to an embodiment of the present invention.

FIG. 16 shows a flow chart showing a method of transmitting data according to an embodiment of the present invention. This method may be performed by a transmitter.

In step S1010, a transmitter generates a vector X(t) for a WSCS channel. The vector X(t) is generated based on a cycle period 1/T of a wide-sense cyclo-stationary (WSCS) noise and a whitening filter W(t) for decorrelating the WSCS noise in frequency domain. The transmit signal X(t) may be generated by the equation (19). Information about the cycle period 1/T and the whitening filter W(t) may be received from a receiver.

In step S1020, the transmitter generates a scalar signal X(t) by shifting the vector X(t) in the frequency domain. The vector X(t) is shifted in frequency domain. Shifting frequencies for the vector X(t) may be obtained based on the cycle period 1/T. Each entry of the vector X(t) may be shifted with different shifting frequency. Entries of the shifted vector are combined to generate the scalar signal X(t), In step 1030, the scalar signal X(t) is transmitted to a receiver via a single antenna. Before converting the vector X(t) into the scalar signal X(t), MIMO processing such as precdoing is performed for the vector X(t).

Although a transmitter has a single antenna, we can utilize various MIMO schemes to improve channel efficiency by using the equivalent MIMO channel.

Figure 17:
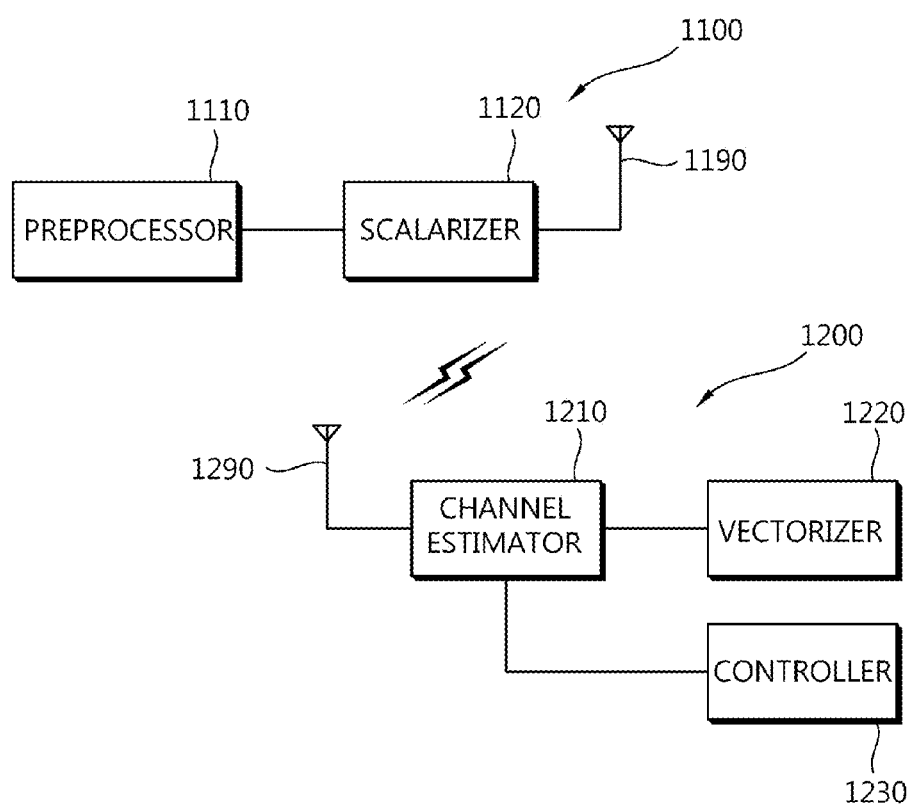
FIG. 17 shows a wireless communication system to implement the present invention.

FIG. 17 shows a wireless communication system to implement the present invention. A transmitter 1100 includes a preprocessor 1110, a scalarizer 1120 and an antenna 1190.

The preprocessor 1110 is configured to generate a vector X(t) based on a cycle period 1/T of a wide-sense cyclo-stationary (WSCS) noise and a whitening filter W(t) for decorrelating the WSCS noise in frequency domain. The scalarizer 1120 configured to generate a scalar signal X(t) by shifting the vector X(t) in the frequency domain. The scalar signal X(t) is transmitted via the antenna 1190.

The receiver 1200 includes a channel estimator 1210, a vectorizer 1220, a controller 1230 and an antenna 1290. The channel estimator 1210 is configured to estimate a channel and wide-sense cyclo-stationary (WSCS) noise by using a receive signal via the antenna 1290. The vectorizer 1220 is configured to convert the receive signal Y(t) to a vector Y(t). The controller 1230 is configured to feedback a cycle period 1/T of the WSCS noise and a whitening filter W(t) for decorrelating the WSCS noise in frequency domain to the transmitter 1100.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the protection.

What is claimed is:

1. A method of transmitting data in a wireless communication system, the method comprising: generating a vector X(t) based on a cycle period 1/T of a wide-sense cyclo-stationary (WSCS) noise and a whitening filter W(t) for decorrelating the WSCS noise in a frequency domain; generating a scalar signal X(t) by shifting the vector X(t) in the frequency domain and combining entries of the shifted vector, wherein each entry of the vector X(t) is shifted with a different shifting frequency; and transmitting the scalar signal X(t) to a receiver via a single antenna.

2. The method of claim 1, wherein shifting frequencies for the vector X(t) are obtained based on the cycle period 1/T.

3. The method of claim 2, wherein the transmit signal X(t) is generated by:

$$X(t) = \sum_{l=1}^{2L+1} X_l(t) e^{j2\pi f_l t}$$

$$\text{where } L = \left\lceil \frac{2BT-1}{2} \right\rceil,$$

lth shifting frequency $$f_l = \frac{l - L - 1}{T},$$

B is a bandwidth, and $X_l(t)$ is the lth entry of the vector X(t).

4. The method of claim 1, further comprising:
receiving information about the cycle period 1/T and the whitening filter W(t) from the receiver.

5. The method of claim 1, wherein the step of generating the vector X(t) comprises:
transforming a channel H(f) to an equivalent channel $\tilde{H}(f)$ by using the whitening filter W(t);
determining a power spectrum $R_{\tilde{X},opt}(f)$ based on the equivalent channel; and
generating the vector X(t) based on the power spectrum $R_{\tilde{X},opt}(f)$.

6. A transmitter comprising: a preprocessor configured to generate a vector X(t) based on a cycle period 1/T of a wide-sense cyclo-stationary (WSCS) noise and a whitening filter W(t) for decorrelating the WSCS noise in a frequency domain; a scalarizer configured to generate a scalar signal X(t) by shifting the vector X(t) in the frequency domain and combining entries of the shifted vector, wherein each entry of the vector X(t) is shifted with a different shifting frequency; and an antenna for transmitting the scalar signal X(t) to a receiver.

7. The transmitter of claim 6, wherein shifting frequencies for the vector X(t) are obtained based on the cycle period 1/T.

8. The transmitter of claim 7, wherein the number of entries of the vector X(t) is an odd number.

9. The transmitter of claim 8, wherein the transmit signal X(t) is generated by:

$$X(t) = \sum_{l=1}^{2L+1} X_l(t) e^{j 2\pi f_l t}$$

where $L = \left\lceil \frac{2BT-1}{2} \right\rceil$, lth shifting frequency $$f_l = \frac{l - L - 1}{T},$$

B is a bandwidth, and $X_l(t)$ is the lth entry of the vector X(t).

10. The transmitter of claim 6, wherein information about the cycle period 1/T and the whitening filter W(t) is received from the receiver.

* * * * *